United States Patent Office 2,933,503
Patented Apr. 19, 1960

2,933,503

BENZIMIDAZOLE DERIVATIVES

Robert L. Clark, Woodbridge, and Arsenio A. Pessolano, Colonia, N.J., assignors to Merck & Co., Inc., Rahway, N.J., a corporation of New Jersey No Drawing. Application January 14, 1957
Serial No. 633,834

1 Claim. (Cl. 260—309.2)

This invention relates to the preparation of the new chemical compounds 5-substituted-benzimidazolones. It is also concerned with the preparation of 2-nitro-4-substituted-acetanilide, 2-nitro-4-substituted-aniline, and 2-amino-4-substituted-aniline, produced as intermediates in the synthesis of 5-substituted-benzimidazolones.

The new chemical compounds with which this invention is concerned, 5-substituted-benzimidazolones, possess anti-convulsant properties.

The starting material utilized in the present invention has the structural formula

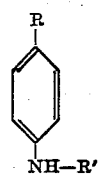

wherein R is an aliphatic group having from 2 to 6 carbon atoms, and R' is an acyl group. Nitration of this product results in a product having the formula

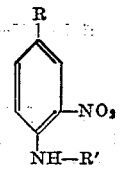

wherein R and R' are as above. The above product is treated with alkali or acid to form a compound of the following structure

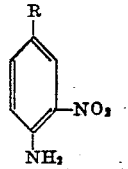

This latter compound is hydrogenated to form a compound having the following structural formula

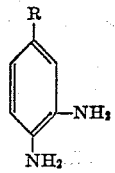

Treatment of the above compound with phosgene or urea results in a compound of the formula

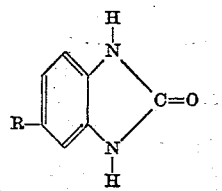

wherein R is as above.

A slurry of para-substituted-acetanilide is reacted with fuming nitric acid and 2-nitro-4-substituted-acetanilide is precipitated.

Treatment of the 2-nitro-4-substituted-acetanilide with alkali such as sodium methylate or an acid such as hydrochloric acid, sulfuric acid, etc. resulted in the formation of 2-nitro-4-substituted-aniline.

The 2-nitro-4-substituted-aniline is treated with hydrogen in the presence of a hydrogenation catalyst to form 2-amino-4-substituted-aniline. This latter compound is treated with urea or phosgene to form a 5-substituted-benzimidazolone.

The following examples are given primarily by way of illustration and not of limitation.

EXAMPLE 1

Preparation of 5-ethylbenzimidazolone

2-NITRO-4-ETHYLACETANILIDE

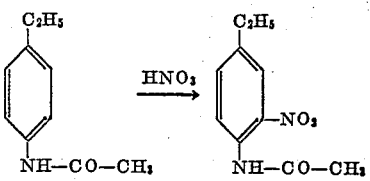

To 70 grams of p-ethylacetanilide was added 20 milliliters of fuming $HNO_3$ in acetic acid. The product 2-nitro-4-ethylacetanilide was isolated as an oil.

2-NITRO-4-ETHYLANILINE

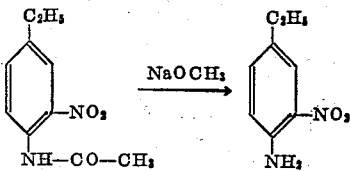

To 80 grams of 2-nitro-4-ethylacetanilide was added a solution of 1.5 grams of sodium in methyl alcohol. The mixture was heated to reflux for 3 hours and 2-nitro-4-ethylaniline was recovered.

2-AMINO-4-ETHYLANILINE DIHYDROCHLORIDE

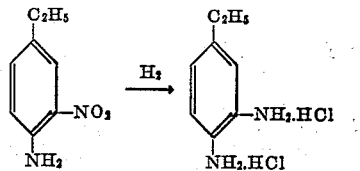

70 grams of crude 2-nitro-4-ethylaniline was dissolved in 300 milliliters of absolute ethyl alcohol and 4 grams of 5% palladium on charcoal was added. The mixture was shaken while a hydrogen atmosphere was maintained in the reaction vessel. The catalyst was removed and dry hydrogen chloride was passed through the filtrate whereupon 2-amino-4-ethylaniline dihydrochloride precipitated. The precipitate was collected and crystallized from ethyl alcohol-ether mixture to yield a product melting at 308° C. with decomposition.

Analysis.—Calculated for $C_8H_{12}N_2 \cdot 2HCl$: C=45.94, H=6.75. Found: C=46.13, H=7.10.

5-ETHYLBENZIMIDAZOLONE

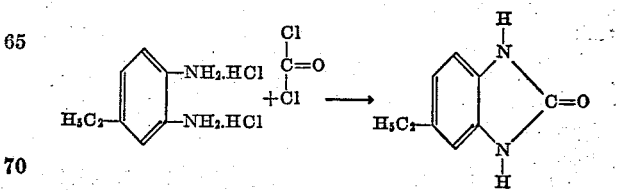

50 grams of 2-amino-4-ethylaniline dihydrochloride was dissolved in 200 milliliters of water and phosgene was passed through this solution until all of the 5-ethylbenzimidazolone was precipitated. The precipitate was collected and crystallized from ethyl alcohol. Recrystallization from ethyl alcohol resulted in 5-ethylbenzimidazolone as white plates melting at 264–265° C.

Analysis.—Calculated for $C_9H_{10}N_2O$: C=66.65, H=6.22, N=17.88. Found: C=66.58, H=5.98, N=17.26.

EXAMPLE 2

*Preparation of 5-propylbenzimidazolone*

2-NITRO-4-PROPYLACETANILIDE

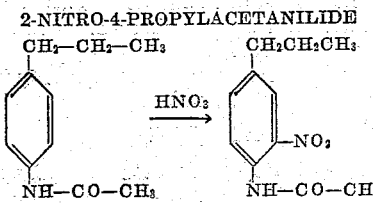

A slurry of 120 grams of 4-propylacetanilide in 100 milliliters of acetic anhydride and 65 milliliters of acetic acid was cooled to 0° C. To this stirred slurry was added a solution of 35 milliliters of fuming nitric acid in 70 milliliters of acetic acid over one hour. The resulting solution was stirred at 0° to 5° C. for two hours, then at room temperature for another two hours, after which it was poured onto ice forming a solid. The product was crystallized from ethanol-water giving 50 grams of 2-nitro-4-propylacetanilide which melted at 135° C.

Analysis.—Calculated for $C_{11}H_{14}N_2O_3$: C, 59.44; H, 6.35. Found: C, 59.62; H, 6.17.

2-NITRO-4-PROPYLANILINE

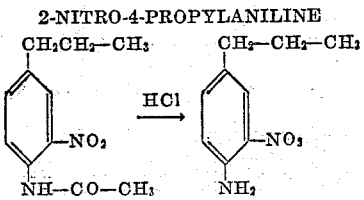

Into 250 milliliters of concentrated hydrochloric acid was added 51 grams of 2-nitro-4-propylacetanilide, and the mixture was refluxed for two hours. The hydrochloride crystallized when the reaction mixture was cooled. This salt was treated with dilute sodium hydroxide giving the free base as an oil which soon solidified. The 2-nitro-4-propylaniline was recrystallized from ethanol-water giving 31 grams of yellow-brown crystals which melted at 59–60° C.

Analysis.—Calculated for $C_9H_{12}N_2O_2$: C, 59.98; H, 6.71. Found: C, 59.95; H, 6.51.

2-AMINO-4-PROPYLANILINE

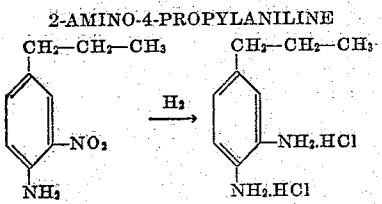

In 250 milliliters of ethanol was dissolved 31 grams of 2-nitro-4-propylaniline, and the mixture was hydrogenated using 2 grams of 5% palladium on charcoal. After twelve hours, approximately three moles of hydrogen had been absorbed per mole of 2-nitro-4-propylaniline. The catalyst was removed and dry hydrogen chloride was passed into the filtrate causing the 2-amino-4-propylaniline dihydrochloride to precipitate. The salt was recrystallized from ethanol-ether giving 14.3 grams of product which melted at 206–210° C. with decomposition.

Analysis.—Calculated for $C_9H_{14}N_2 \cdot 2HCl$: C, 48.44; H, 7.23. Found: C, 48.79; H, 7.50.

5-PROPYLBENZIMIDAZOLONE

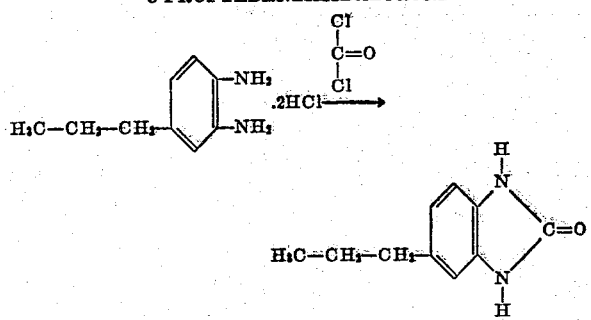

A solution of 14 grams of 2-amino-4-propylaniline dihydrochloride was dissolved in 200 milliliters of water and was treated with phosgene. The precipitated 5-propylbenzimidazolone was filtered off and washed well with water. It was crystallized by dissolving in warm ethanol and adding water. The product weighed 4.8 grams and melted at 239–241° C.

Analysis.—Calculated for $C_{10}H_{12}N_2O$: C, 68.14; H, 6.87; N, 15.90. Found: C, 68.16; H, 6.51; N, 16.14.

EXAMPLE 3

*Preparation of 5-propylbenzimidazolone*

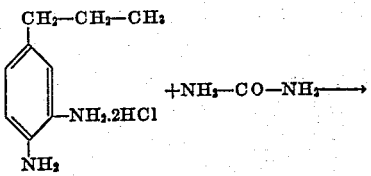

A mixture of 22.3 grams of 2-amino-4-propylaniline dihydrochloride and 7.0 grams of urea was heated in an oil bath at 180° C. There was a homogeneous melt at this temperature which solidified after twenty minutes. The solid was extracted with three 75 milliliter portions of 2.5 N sodium hydroxide. The sodium hydroxide extracts were combined and made acid with concentrated hydrochloric acid. The precipitated 5-propylbenzimidazolone was filtered and washed well with water. It was crystallized by dissolving in ethanol and adding water. The product weighed 6.5 grams and melted at 239–241° C.

Analysis.—Calculated for $C_{10}H_{12}N_2O$: C, 68.14; H, 6.87; N, 15.90. Found: C, 68.24; H, 6.70; N, 15.99.

EXAMPLE 4

*Preparation of 5-isopropylbenzimidazolone*

2-NITRO-4-ISOPROPYLACETANILIDE

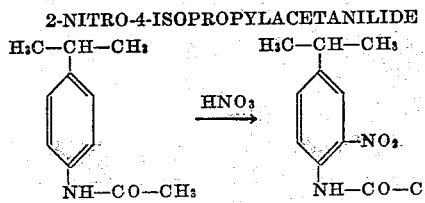

A slurry of 30 grams of para-isopropylacetanilide in 30 milliliters of acetic anhydride and 30 milliliters of acetic acid was prepared. The slurry thus formed was cooled to −10° C. using a Dry Ice-acetone bath, and 7.2 milliliters of fuming nitric acid in 20 milliliters of acetic acid was added slowly to the mixture while stirring over a period of one-half hour. After the addition of the fuming nitric acid-acetic acid mixture, the solution was maintained at −10° C. for one hour and then allowed to come to room temperature. After fifteen hours the reaction mixture was poured into ice-water whereupon 2-nitro-4-isopropylacetanilide precipitated from solution. The precipitate was collected and washed well with water. One gram of 2-nitro-4-isopropylacetanilide was recrystallized from an ethyl alcohol-water mixture resulting in a yellow product which melted at 81 to 82° C.

*Analysis.*—Calculated for $C_{11}H_{14}N_2O_3$: C, 59.44; H, 6.35. Found C, 59.30; H, 6.32.

2-NITRO-4-ISOPROPYLANILINE

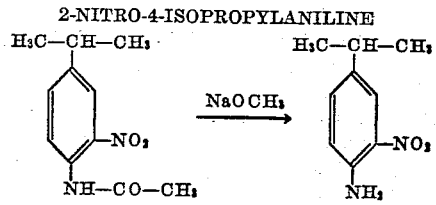

In 75 milliliters of methyl alcohol was dissolved 0.5 gram of sodium and to this solution was added 32 grams of crude 2-nitro-4-isopropylaniline. This solution was heated under reflux for two hours resulting in a dark solution. After evaporating the solvents the residual dark oil was taken up in ether, washed once with a small quantity of water, dried and the ether evaporated to give 2-nitro-4-isopropylaniline.

2-AMINO-4-ISOPROPYLANILINE DIHYDROCHLORIDE

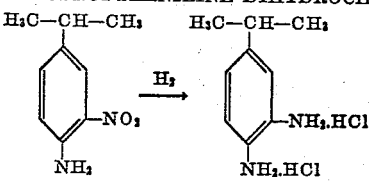

28 grams of crude 2-nitro-4-isopropylaniline was dissolved in 100 milliliters of absolute ethyl alcohol and two grams of 5% palladium on charcoal was added. The mixture was shaken while a hydrogen atmosphere was maintained in the reaction vessel. After 45 minutes approximately three moles of hydrogen had been absorbed per mole of 2-nitro-4-isopropylaniline. The catalyst was removed and dry hydrogen chloride was passed into the filtrate whereupon 2-amino-4-isopropylaniline dihydrochloride precipitated. The light pink precipitate was collected and washed well with ether. The crude product had a melting point of about 267° C. with decomposition. One gram was crystallized from an ethyl alcohol in water mixture to give 2-amino-4-isopropylaniline dihydrochloride with a melting point of 267° C.

*Analysis.*—Calculated for $C_9H_{14}N_2 \cdot 2HCl$: C, 48.44; H, 7.23. Found: C, 48.36; H, 7.11.

5-ISOPROPYLBENZIMIDAZOLONE

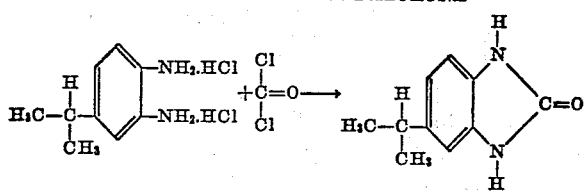

In 200 milliliters of warm water was dissolved 26.5 grams of 2-amino-4-isopropylaniline dihydrochloride, phosgene was passed into this solution and after a few minutes 5-isopropylbenzimidazolone began to precipitate. The phosgene was added for one and one-half hours after which the pink solid was collected and washed well with water. The 5-isopropylbenzimidazolone thus obtained had a melting point of 270° C. It was recrystallized from 250 milliliters of absolute ethyl alcohol. The crystals were collected and washed with ether to remove the color. The purified product had a melting point of 270° to 272° C. When water was added to the mother liquid additional 5-isopropylbenzimidazolone having the same melting point, i.e. 270°–272° C. was precipitated.

*Analysis.*—Calculated for $C_{10}H_{12}N_2O$: C, 68.14; H, 6.87; N, 15.90. Found: C, 67.90; H, 6.83; N, 15.78.

EXAMPLE 5

*Preparation of 5-n-butylbenzimidazolone*

2-NITRO-4-N-BUTYLACETANILIDE

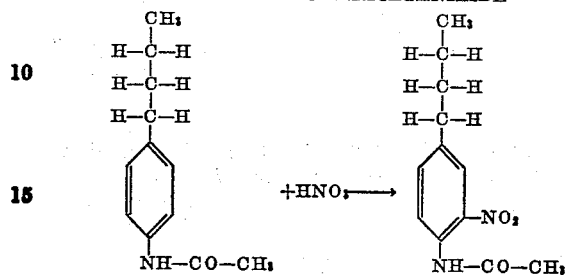

To a solution of 80 ml. of acetic acid and 50 ml. of acetic anhydride was added 67 g. of 4-n-butylacetanilide. The mixture was cooled to 0° C. and then with stirring 100 ml. of fuming nitric acid in 50 ml. of acetic acid was added over one hour. The temperature was maintained below 5° C. After one more hour the solution was poured onto ice and 2-nitro-4-n-butylacetanilide separated. The 2-nitro-4-n-butylacetanilide was recovered and had a melting point of 71–73° C.

2-NITRO-4-N-BUTYLANILINE

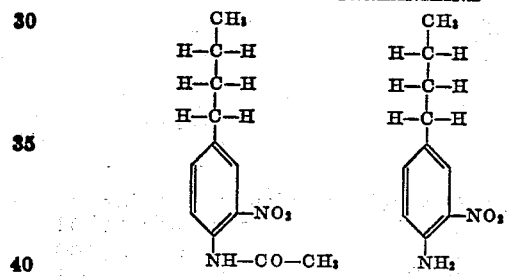

Fifty grams of 2-nitro-4-n-butylacetanilide was added to 300 ml. of concentrated hydrochloric acid and the suspension heated to reflux. A clear solution resulted but soon a dark oil separated. After four hours reflux the mixture was cooled, diluted with water and partially neutralized with ammonium hydroxide. The oil was extracted with ether, washed with water and the ether solution dried. Evaporation of the ether gave 2-nitro-4-n-butylaniline.

2-AMINO-4-N-BUTYLANILINE

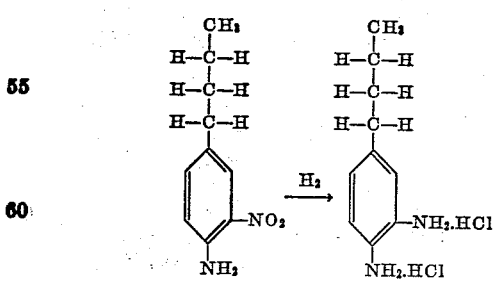

The above 2-nitro-4-n-butylaniline was dissolved in 200 ml. of ethanol and hydrogenated using 3 g. of 5% palladium on charcoal as the catalyst. After removing the catalyst by filtration dry hydrogen chloride was passed into the filtrate. The 2-amino-4-n-butylaniline dihydrochloride began to crystallize after ten minutes. Ether was added to precipitate more product. A total of 40 g. was collected. After recrystallization from absolute ethanol the melting point was 235° C. with decomposition.

*Analysis.*—Calculated for $C_{10}H_{16}N_2 \cdot 2HCl$: C, 50.63; H, 7.65. Found: C, 50.52; H, 7.80.

5-N-BUTYLBENZIMIDAZOLONE

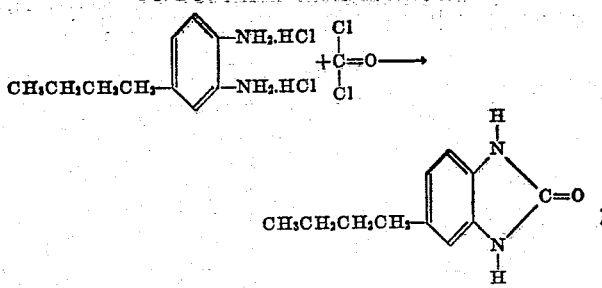

Thirty-nine grams of 2-amino-4-n-butylaniline dihydrochloride was dissolved in 250 ml. of water and then treated with phosgene for two hours. 5-n-butylbenzimidazolone separated rapidly and was collected by filtration. It weighed 30 g. and melted at 248° C. It could be crystallized by dissolving it in 150 ml. of hot alcohol and then precipitating it by the careful addition of water. This material melted at 250° C.

*Analysis.*—Calculated for $C_{11}H_{14}N_2O$: C, 69.43; H, 7.42; N, 14.73. Found: C, 69.28; H, 7.54; N, 14.39.

EXAMPLE 6

*Preparation of 5-isobutylbenzimidazolone*

2-NITRO-4-ISOBUTYLACETANILIDE

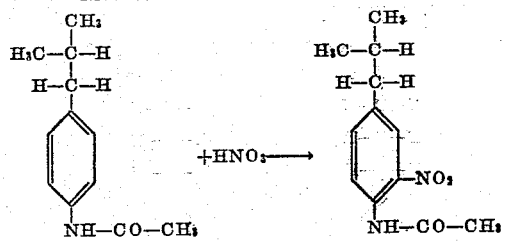

11.3 grams (0.06 mole) of p-isobutylacetanilide was dissolved in 7 milliliters of glacial acetic acid and 11 milliliters of acetic anhydride. To this solution was added 5 milliliters (6.7 grams, 0.11 mole of nitric acid) of fuming nitric acid in 6 milliliters of acetic acid over one-half hour at 10° to 20° C. This mixture was stirred for four hours at 0° to 5° C. and then allowed to warm up to room temperature gradually over a period of 15 hours. The mixture was then poured into water whereupon a precipitate of 2-nitro-4-isobutylacetanilide separated from solution. This mixture was filtered and washed with water and bicarbonate solution and water, to yield 2-nitro-4-isobutylacetanilide having a melting point from 57° to 60° C. Recrystallization from alcohol and water resulted in a product melting at 63° to 65° C.

*Analysis.*—Calculated for $C_{12}H_{16}N_2O_3$: C, 60.99; H, 6.83; N, 11.86. Found: C, 60.71; H, 6.90; N, 12.32.

2-NITRO-4-ISOBUTYLANILINE

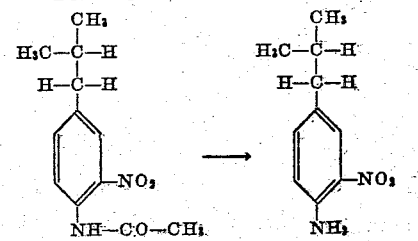

To 12 grams (0.051 mole) of 2-nitro-4-isobutylacetanilide having a melting point of 63–65° C. was added 36 milliliters of methyl alcohol containing 0.21 gram of sodium. The mixture was refluxed for two hours and was then poured into water. The precipitate, 2-nitro-4-isobutylaniline, thus formed was collected. This product had a melting point of 50°–52° C. Several recrystallizations from alcohol and water raised the melting point of the 2-nitro-4-isobutylaniline to 52° to 54° C.

*Analysis.*—Calculated for $C_{10}H_{14}N_2O_2$: C, 61.84; H, 7.27; N, 14.43. Found: C, 61.57; H, 7.30; N, 14.26.

2-AMINO-4-ISOBUTYLANILINE DIHYDROCHLORIDE

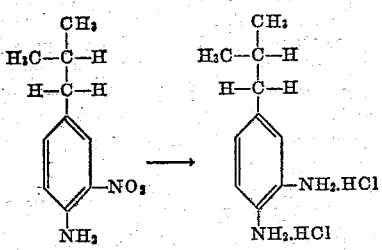

8.5 grams (0.044 mole) of 2-nitro-4-isobutylaniline, having a melting point of 50° to 52° C., was hydrogenated in 110 cc. of absolute ethyl alcohol over 1 gram of 5% palladium on charcoal catalyst at 40 lbs. pressure and room temperature, in about 16 hours. The catalyst was removed by filtration and the solution was treated with dry hydrogen chloride. The precipitate of 2-amino-4-isobutylaniline dihydrochloride was collected and had a melting point of 218–230° C. The precipitate was recrystallized from alcohol and the product thus obtained had a melting point of 229–230° C. Two more recrystallizations from alcohol resulted in material melting at 230°–232° C. with decomposition.

*Analysis.*—Calculated for $C_{10}H_{16}N_2.2HCl$: C, 50.63; H, 7.65; Cl, 29.90. Found: C, 50.44; H, 7.40; Cl, 29.6.

5-ISOBUTYLBENZIMIDAZOLONE

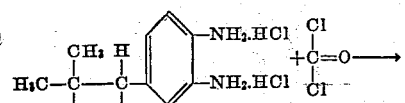

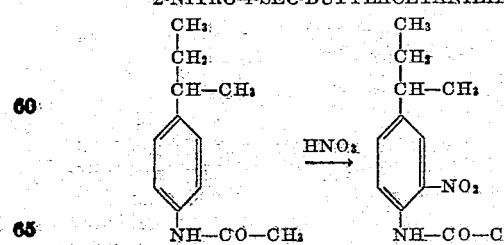

7.3 grams (0.031 mole) of 2-amino-4-isobutylaniline dihydrochloride was dissolved in 500 milliliters of water. The mixture was treated with charcoal, filtered and then treated with phosgene for two hours at room temperature. The precipitate of 5-isobutylbenzimidazolone was collected and had a melting point of 264–267° C. This product was recrystallized from ethyl acetate resulting in a product having a melting point of 266–270° C.

*Analysis.*—Calculated for $C_{11}H_{14}N_2O$: C, 69.45; H, 7.42; N, 14.73. Found: C, 69.59; H, 7.45; N, 14.78.

EXAMPLE 7

*Preparation of 5-sec-butylbenzimidazolone*

2-NITRO-4-SEC-BUTYLACETANILIDE

A slurry was made of 26 grams of 4-sec-butylacetanilide in 30 milliliters of acetic anhydride and 18 milliliters of acetic acid. The slurry thus formed was cooled to 5° C., and 8 milliliters of fuming nitric acid in 20 milliliters of acetic acid was added to the stirred mixture over thirty minutes. After the addition, the solution was maintained at 5° C. for two hours then allowed to come to room temperature overnight. 2-nitro-4-sec-butylacetanilide was thus formed.

2-NITRO-4-SEC-BUTYLANILINE

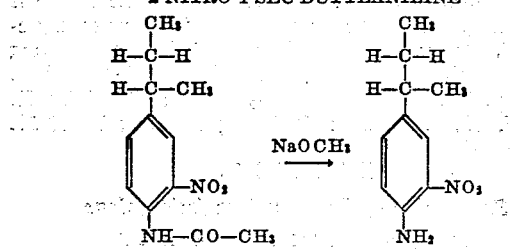

In 100 milliliters of methyl alcohol was dissolved 1 gram of sodium and to this solution was added 32 grams of crude 2-nitro-4-sec-butylacetanilide. This solution was heated under reflux for two hours. After evaporating the solvents the oil contained 2-nitro-4-sec-butylaniline.

2-AMINO-4-SEC-BUTYLANILINE DIHYDROCHLORIDE

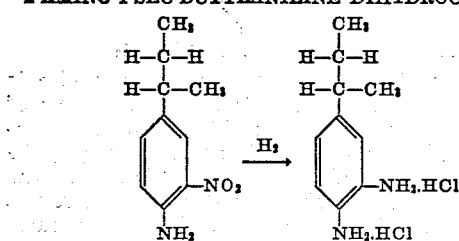

26 grams of crude 2-nitro-4-secondary butylaniline was dissolved in 200 milliliters of absolute ethyl alcohol and 3 grams of 5% palladium or charcoal was added. The mixture was shaken while a hydrogen atmosphere was maintained in the reaction vessel. After hydrogenation was complete, the catalyst was removed and dry hydrogen chloride was passed through the filtrate whereupon 2-amino-4-sec-butylaniline dihydrochloride precipitated. The precipitate was collected.

*Analysis.*—Calculated for $C_{10}H_{16}N_2 \cdot 2HCl$: C=50.63; H=7.65. Found: C=50.78; H=7.37.

5-SEC-BUTYLBENZIMIDAZOLONE

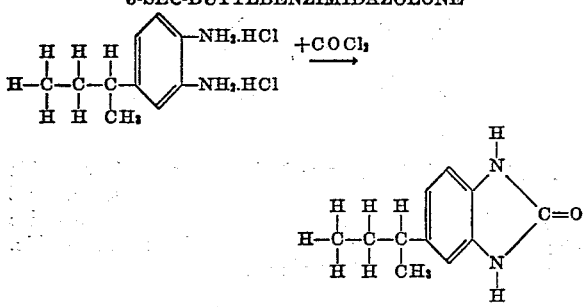

In 150 milliliters of warm water was dissolved 22 grams of 2-amino-4-sec-butylaniline dihydrochloride, phosgene was passed through this solution and after a few minutes 5-sec-butylbenzimidazolone began to precipitate. The precipitate was collected and crystallized from ethyl alcohol-water mixture. Recrystallization from ethyl alcohol-water resulted in 5-sec-butylbenzimidazolone having a melting point of 251–252° C.

*Analysis.*—Calculated for $C_{11}H_{14}N_2O$: C=69.43; H=7.42; N=14.73. Found: C=69.61; H=7.28; N=15.07.

EXAMPLE 8

*Preparation of 5-t-butylbenzimidazolone*

2-NITRO-4-T-BUTYLACETANILIDE

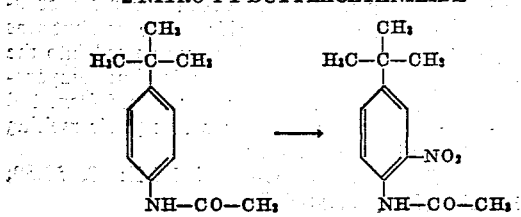

To 30 grams of 4-t-butylacetanilide was added 30 milliliters of acetic anhydride and 18 milliliters of acetic acid. This slurry was cooled to —10° C. and slowly a mixture of 7.8 ml. of fuming nitric acid and 18 milliliters of acetic acid was added. The temperature was maintained at —10° C. for one and one-half hours and then was allowed to warm up and stand for 15 hours. It was then poured into 1200 milliliters of ice-water and the product, 2-nitro-4-t-butylacetanilide, removed by filtration, melting point 104–106° C.

2-NITRO-4-T-BUTYLANILINE

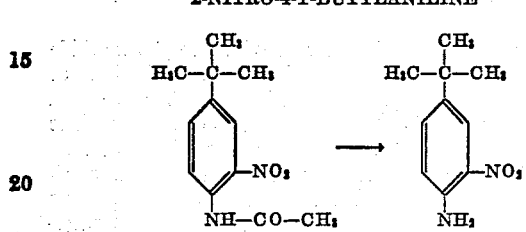

A solution obtained by dissolving 0.35 gram of sodium in 60 milliliters of methyl alcohol was added to 20 grams of 2-nitro-4-t-butylacetanilide. The mixture was heated under reflux for two hours, then cooled and the solid, 2-nitro-4-t-butylaniline, having a melting point of 106–107° C. was removed by filtration. Concentration of the filtrate resulted in a product having a melting point of 100–102° C.

2-AMINO-4-T-BUTYLANILINE DIHYDROCHLORIDE

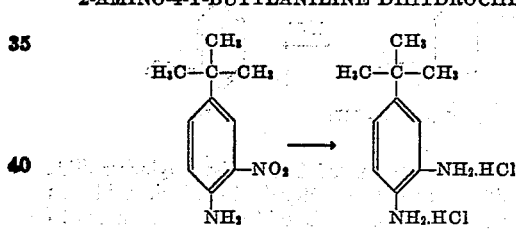

Nine and seven-tenths grams of 2-nitro-4-t-butylaniline was dissolved in 200 milliliters of ethyl alcohol. To this solution was added two grams of 5% palladium on charcoal. A hydrogen atmosphere was maintained while the mixture was agitated. Approximately three molar equivalents of hydrogen was absorbed thus forming 2-amino-4-t-butylaniline. The catalyst was then removed by filtration and dry hydrogen chloride was passed into the filtrate. The precipitated 2-amino-4-t-butylaniline dihydrochloride was removed by filtration. It melted at 274–277° C.

5-T-BUTYLBENZIMIDAZOLONE

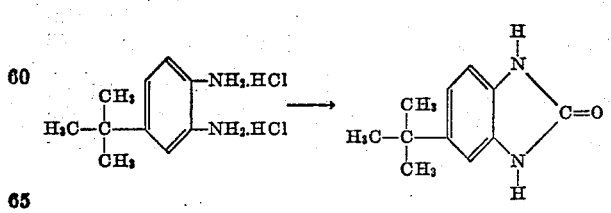

Into a solution of 10 grams of 2-amino-4-t-butylaniline dihydrochloride in 100 milliliters of warm water was passed phosgene. Almost immediately 5-t-butylbenzimidazolone separated from the solution. After one hour the 5-t-butylbenzimidazolone was removed by filtration. The 5-t-butylbenzimidazolone thus obtained had a melting point of 310° C. (softened at 300° C.).

*Analysis.*—Calculated for $C_{11}H_{14}N_2O$: C, 69.43; H, 7.42; N, 14.72. Found: C, 69.54; H, 7.49; N, 15.16.

EXAMPLE 9

*Preparation of 5-t-amylbenzimidazolone*

2-NITRO-4-T-AMYLACETANILIDE

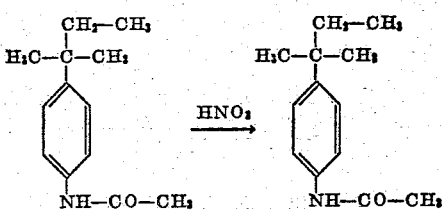

A slurry was made of 41 grams of 4-t-amylacetanilide in 50 milliliters of acetic anhydride and 30 milliliters of acetic acid. To this slurry cooled to 0° C. was added with stirring, a solution of 10.3 milliliters of fuming nitric acid over one-half hour. The yellow solution was kept at 0° C. for one hour after the addition and then allowed to come to room temperature for another hour. The solution was poured onto ice and the 2-nitro-4-t-amylacetanilide precipitated. It was collected and crystallized from petroleum ether giving 47 grams of product which melted at 53–54° C.

*Analysis.*—Calculated for $C_{13}H_{18}N_2O_3$: C, 62.39; H, 7.25. Found: C, 62.53; H, 7.09.

2-NITRO-4-T-AMYLANILINE

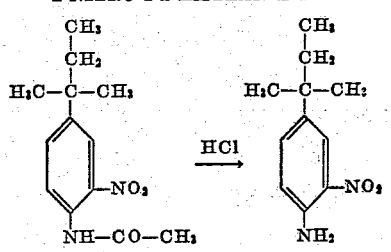

A mixture of 47 grams of 2-nitro-4-t-amylacetanilide and 25 milliliters of concentrated hydrochloric acid was refluxed for three hours. This acid solution contains 2-nitro-4-t-amylaniline.

2-AMINO-4-T-AMYLANILINE

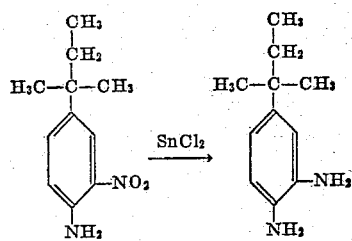

To a hydrochloric acid solution containing approximately 34 grams of 2-nitro-4-t-amylaniline in 250 ml. concentrated hydrochloric acid was slowly added a solution of 200 grams of stannous chloride dihydrate in 100 milliliters of concentrated hydrochloric acid. The temperature was kept below 45° C. during the addition. After standing for 12 hours the solution was treated with charcoal yielding a clear yellow solution containing 2-amino-4-t-amylaniline.

5-T-AMYLBENZIMIDAZOLONE

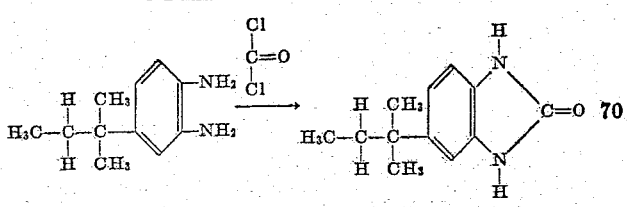

To a solution of 29 grams of 2-amino-4-t-amylaniline in 200 milliliters of concentrated hydrochloric acid was added phosgene. The 5-t-amylbenzimidazolone soon precipitated. It was crystallized from 95% ethanol giving crystals weighing 20 grams, and melting at 284–285° C.

*Analysis.*—Calculated for $C_{12}H_{16}N_2O$: C, 70.55; H, 7.90; N, 13.72. Found: C, 70.46; H, 7.89; N, 13.57.

EXAMPLE 10

*Preparation of 5-sec-amylbenzimidazolone*

2-NITRO-4-SEC-AMYLACETANILIDE

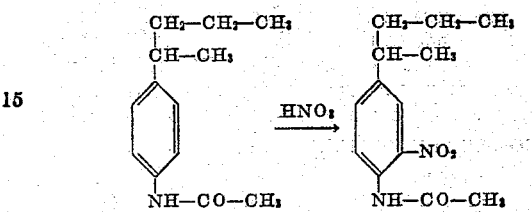

To a slurry of 50 grams of 4-sec-amylacetanilide in 50 milliliters of acetic anhydride and 30 milliliters of acetic acid was added a solution of 15 milliliters of fuming nitric acid in 30 milliliters of acetic acid, keeping the temperature of the reaction mixture at 0° to 5° C. The addition was made over one hour, then the mixture was kept at 0° to 5° C. for two hours. It was allowed to come to room temperature where it was kept for another two hours. The mixture was poured onto ice forming an oil which was extracted with ether. The ether extract was washed with three 100 milliliter portions of dilute ammonium hydroxide and finally with a 100 ml. portion of water. The ether solution was dried over magnesium sulfate then evaporated leaving an oil containing 2-nitro-4-sec-amylacetanilide.

2-NITRO-4-SEC-AMYLANILINE

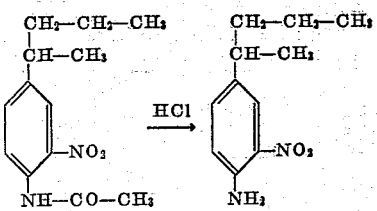

A mixture of 62 grams of 2-nitro-4-sec-amylacetanilide and 250 milliliters of concentrated hydrochloric acid was refluxed for four hours. The solution was cooled in ice giving crystals of 2-nitro-4-sec-amylaniline hydrochloride. These crystals weighed 48 grams.

2-AMINO-4-SEC-AMYLANILINE

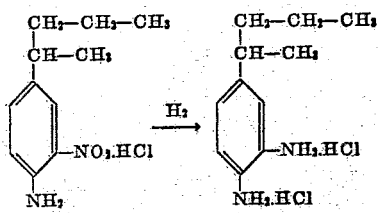

In 200 milliliters of ethanol was dissolved 24.5 grams of 2-nitro-4-sec-amylaniline hydrochloride and the solution was hydrogenated using 3 grams of 5% palladium on charcoal. After twenty hours approximately three moles of hydrogen had been absorbed per mole of 2-nitro-4-sec-amylaniline hydrochloride. The catalyst was removed and dry hydrogen chloride was passed into the filtrate causing the 2-amino-4-sec-amylaniline dihydrochloride to crystallize. This was recrystallized from 100 milliliters of ethanol giving 18 grams of crystals melting at 214–217° C. with decomposition.

*Analysis.*—Calculated for $C_{11}H_{18}N_2 \cdot 2HCl$: C, 52.59; H, 8.03. Found: C, 52.49; H, 8.02.

5-SEC-AMYLBENZIMIDAZOLONE

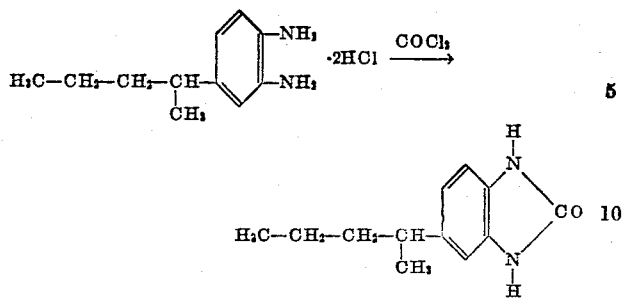

Eighteen grams of 2-amino-4-sec-amylaniline dihydrochloride was dissolved in 100 milliliters warm water and phosgene was passed into the solution. The 5-sec-amylbenzimidazolone formed quickly as a precipitate. It was collected and crystallized from 200 milliliters of ethyl acetate. The crystals weighed 9.0 grams with a melting point of 217–218.

*Analysis.*—Calculated for $C_{12}H_{16}N_2O$: C, 70.55; H, 7.90; N, 13.72. Found: C, 70.77; H, 7.83; N, 14.00.

EXAMPLE 11

*Preparation of 5-n-hexyl benzimidazolone*

2-NITRO-4-N-HEXYLACETANILIDE

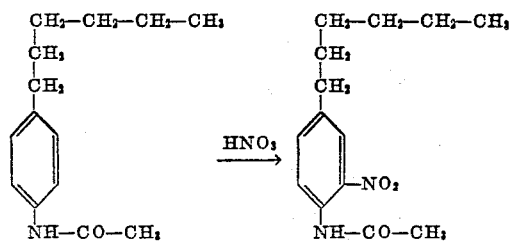

A nitrating solution of 5 milliliters of fuming nitric acid in 10 milliliters of acetic acid was added over 30 minutes to a slurry of 16 grams of 4-n-hexylacetanilide in 40 milliliters of acetic anhydride and 20 milliliters of acetic acid. The temperature was kept at 0° to 5° C. for one hour then at room temperature for two hours. The solution was poured onto ice and a yellow oil formed which soon solidified. This crude 2-nitro-4-n-hexylacetanilide was crystallized by dissolving in ethanol and carefully adding water. The yellow crystals weighed 13.5 grams with a melting point of 51–52° C.

*Analysis.*—Calculated for $C_{14}H_{20}N_2O_3$: C, 63.62; H, 7.63; N, 10.60. Found: C, 63.41; H, 7.26; N, 10.63.

2-NITRO-4-N-HEXYLANILINE

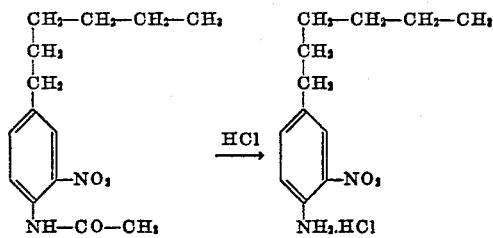

A mixture of 100 milliliters of concentrated hydrochloric acid and 10 grams of 2-nitro-4-n-hexylacetanilide was refluxed for four hours. On cooling, the 2-nitro-4-n-hexylaniline separated as the hydrochloride which was collected. It weighed 10 grams.

2-AMINO-4-N-HEXYLANILINE

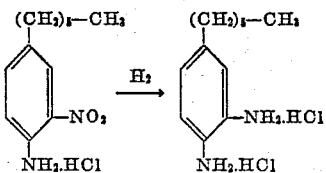

Ten grams of 2-nitro-4-n-hexylaniline hydrochloride was dissolved in 75 milliliters of ethanol and this was hydrogenated using 2 grams of 5% palladium on charcoal as the catalyst. The reaction mixture was heated at 60° C. for 14 hours before three moles of hydrogen was absorbed per mole of 2-nitro-4-hexylaniline hydrochloride. The catalyst was removed and dry hydrogen chloride was passed into the filtrate. The ethanol was removed by evaporation and the residue contained 2-amino-4-n-hexylaniline as the hydrochloride.

5-N-HEXYLBENZIMIDAZOLONE

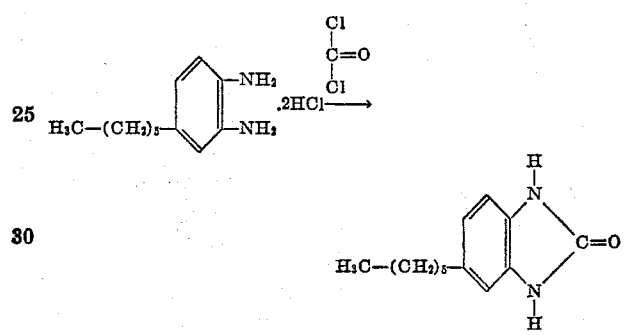

A solution of 7 grams of 2-amino-4-n-hexylaniline dihydrochloride in 100 milliliters of 1 N hydrochloric acid was treated with phosgene. The 5-n-hexylbenzimidazolone which precipitated was collected and washed well with water. It was crystallized from 120 milliliters of ethyl acetate giving 1.6 grams of crystals which melted at 250–252° C.

*Analysis.*—Calculated for $C_{13}H_{18}N_2O$: C, 71.53; H, 8.31; N, 12.84. Found: C, 71.38; H, 8.10; N, 12.70.

Various changes and modifications of the invention can be made and, to the extent that such variations incorporate the spirit of this invention, they are intended to be included within the scope of the appended claim.

We claim:
5-t-butylbenzimidazolone.

References Cited in the file of this patent
UNITED STATES PATENTS

| | | |
|---|---|---|
| 2,166,198 | Sexton | July 18, 1939 |
| 2,311,054 | Kenyon et al. | Feb. 16, 1943 |
| 2,686,810 | Koch et al. | Aug. 17, 1954 |
| 2,757,197 | Linch | July 31, 1956 |

OTHER REFERENCES

Hartman: Ber. Deut. Chem., vol. 23, pp. 1046–50 (1890).

Vaughan et al.: J. Am. Chem. Soc., vol. 77, pp. 5757–60 (1955).

Reilly et al.: Chem. Abstr., vol. 14, p. 1817 (1920).
Koner et al.: Chem. Abstr., vol. 29, col. 1824 (1935).
Lambooy et al.: J. Am. Chem. Soc., vol. 74, pp. 1087–9 (1952).

Wright: Chem. Reviews, vol. 48, pp. 446–452 (1951).